(12) United States Patent  
Albertini et al.

(10) Patent No.: US 6,658,723 B1
(45) Date of Patent: Dec. 9, 2003

(54) METHOD FOR COLLECTIVE PRODUCTION OF MAGNETIC HEADS HAVING A BEARING SURFACE WITH SPECIFIC HEIGHT

(75) Inventors: Jean-Baptiste Albertini, Grenoble (FR); Gérard Barrois, Le Fontanil (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/508,505

(22) PCT Filed: Jul. 27, 1999

(86) PCT No.: PCT/FR99/01838
§ 371 (c)(1),
(2), (4) Date: Mar. 23, 2000

(87) PCT Pub. No.: WO00/07179
PCT Pub. Date: Feb. 10, 2000

(30) Foreign Application Priority Data

Jul. 28, 1998 (FR) .............................................. 98 09642

(51) Int. Cl.⁷ ........................ G11B 5/127; H04R 31/00
(52) U.S. Cl. ................... 29/603.16; 29/603.07; 29/603.12; 29/603.15; 216/22; 360/121; 360/122; 451/41; 451/364; 451/384
(58) Field of Search ................... 29/603.07, 603.1, 29/603.12, 603.15, 603.16; 451/41, 364, 384; 360/121, 122; 216/22

(56) References Cited

U.S. PATENT DOCUMENTS

| | | | | | |
|---|---|---|---|---|---|
| 4,049,944 A | * | 9/1977 | Garvin | ........................ | 219/121 |
| 4,334,950 A | * | 6/1982 | Roman | ........................ | 216/22 |
| 4,437,924 A | * | 3/1984 | Weglin | ........................ | 216/41 |
| 4,552,831 A | * | 11/1985 | Liu | ........................ | 430/296 |
| 4,891,878 A | * | 1/1990 | Kawai et al. | ........... | 29/603.11 |
| 4,899,434 A | * | 2/1990 | Roberts | ........................ | 29/603 |
| 5,042,140 A | * | 8/1991 | Coutellier | ........................ | 29/603 |
| 5,156,704 A | * | 10/1992 | Kemp | ........................ | 156/665 |
| 5,167,062 A | * | 12/1992 | Castera et al. | ......... | 229/603.14 |
| 5,174,857 A | * | 12/1992 | Sung | ........................ | 216/48 |
| 5,200,025 A | * | 4/1993 | Toei et al. | ........................ | 216/12 |
| 5,222,006 A | * | 6/1993 | Yanagi | ........................ | 360/126 |
| 5,250,150 A | * | 10/1993 | Gaud | ........................ | 156/647 |
| 5,331,497 A | * | 7/1994 | Fuchigami | ........................ | 360/126 |
| 5,521,781 A | * | 5/1996 | Kaneko et al. | ........... | 360/135 |
| 5,526,950 A | * | 6/1996 | Tago et al. | ........................ | 216/12 |
| 5,566,442 A | * | 10/1996 | Gaud | ........................ | 29/603.14 |
| 5,715,122 A | * | 2/1998 | Ohmori et al. | ........... | 360/123 |
| 5,826,326 A | * | 10/1998 | Gooch et al. | ........... | 29/603.13 |
| 5,842,269 A | * | 12/1998 | Albertini et al. | ......... | 29/603.13 |
| 5,870,123 A | * | 2/1999 | Lorenze | ........................ | 347/65 |
| 5,883,765 A | * | 3/1999 | Gaud | ........................ | 360/126 |
| 5,920,762 A | * | 7/1999 | Simmons | ........................ | 438/3 |
| 5,935,451 A | * | 8/1999 | Dautartas et al. | ........... | 216/2 |
| 6,024,884 A | * | 2/2000 | Bryant | ........................ | 216/2 |
| 6,034,852 A | * | 3/2000 | Nakano | ........................ | 360/137 |
| 6,057,081 A | * | 5/2000 | Yunogami et al. | ......... | 430/313 |
| 6,126,880 A | * | 10/2000 | Scholl | ........................ | 264/219 |
| 6,156,485 A | * | 12/2000 | Tang et al. | ........................ | 430/313 |
| 6,167,611 B1 | * | 1/2001 | Gaud | ........................ | 29/603.14 |
| 6,183,940 B1 | * | 2/2001 | Wang et al. | ................. | 430/328 |
| 6,319,419 B1 | * | 11/2001 | Ohhashi et al. | ............... | 216/56 |
| 6,335,846 B1 | * | 1/2002 | Gaud | ........................ | 360/123 |

* cited by examiner

Primary Examiner—Peter Vo
Assistant Examiner—Paul Kim
(74) Attorney, Agent, or Firm—Oblon, Spivak, McClelland, Maier & Neustadt, P.C.

(57) ABSTRACT

Process for collective production of integrated magnetic heads with a supporting surface with a determined height. According to the invention the components of a board are thinned collectively be etching the board along area overlapping polar parts.

16 Claims, 5 Drawing Sheets

METHOD FOR COLLECTIVE PRODUCTION OF MAGNETIC HEADS HAVING A BEARING SURFACE WITH SPECIFIC HEIGHT

DESCRIPTION

1. Technical Field

The purpose of this invention is a process for collective production of integrated magnetic heads with a determined height of the supporting surface.

Its applications are the production of helical recording heads on a magnetic tape, particularly for video recordings for the general public and for professional applications (VCRs for the home, camescopes) and for equipment used to save computer data on tapes or disks.

High frequencies made possible by the small size of heads integrated in thin layers enable digital recording (for example according to the DVC standard for video, or the DDS standard for data processing). Computer mass memories including tape data recorders have the highest storage capacities and the lowest costs. Computer applications include data archiving systems, backups of hard disks for a system or a network for the distribution of large software or data bases. VCR video recording applications could be extended to include applications for a video server on which several films are stored centrally.

2. State of Prior Art

FIGS. 1 to 3 attached illustrate the structure of a component for an integrated magnetic head with thin layers according to document FR-A-2 747 226. As illustrated in FIG. 1, the head comprises two polar parts $10_1$, $10_2$ separated by an airgap 14, two magnetic arms $16_1$, $16_2$ partly covering the polar parts, and a magnetic flux closing part 18. All of these parts form a magnetic circuit. Conducting windings $20_1$, $20_2$, are placed around the arms $16_1$, $16_2$, not shown, to read and/or write the information written and/or read on a recording support.

FIG. 2 shows the complete head with two conducting strips $22_1$, $22_2$ used to access conducting windings $20_1$, $20_2$ and two electrical connection pins $24_1$, $24_2$.

The head shown in FIGS. 1 and 2 may be made collectively using techniques taken from micro-electronics. The components can be separated from each other by storing them in a matrix structure and then cutting them along straight lines, in order to obtain an individual magnetic head from a plate containing a number of components. A rounded supporting surface necessary for correct operation of the head is obtained by machining the front part of the components of each head close to polar parts $10_1$, $10_2$. In FIG. 2, the rounded profile is shown diagrammatically by line 26. This operation is carried out mechanically on each head.

FIG. 3 diagrammatically shows a longitudinal section along one of the conducting strips of a head and one of the arms of the magnetic circuit. It shows a substrate 30, for example made of silicon, with one of the polar parts $10_1$ or $10_2$, a magnetic arm $16_1$, or $16_2$, a magnetic closing part 18, a conducting strip $22_1$, or $22_2$ and electrical connection pins $24_1$, $24_2$. The assembly is covered by a superstrate 40, for example made of silicon. The supporting surface 26 near the front of the head has an appropriate rounded shape. Towards the back, the superstrate 40 is exposed to show the electrical connection pins $24_1$, $24_2$.

The substrate—superstrate assembly may be thicker than the thickness required for the supporting surface. For example, 500 $\mu$m thick silicon substrates and 300 to 500 $\mu$m superstrates are used frequently, although the thickness of polar parts at the supporting surface must not exceed about 300 $\mu$m. This is why the magnetic head is thinner at polar parts, as shown in FIG. 3, where it can be seen that the height h of the supporting surface is less than the thickness of the assembly. This makes the contact between the head and the recording support more intimate.

A helical recording head on a tape with a thickness of a few hundred micrometers may be made thinner, for example to a value of between 40 and 80 $\mu$m.

The head is thinned individually on each head, which is obviously expensive. Furthermore, this operation is very difficult and could irreparably damage the head, seriously reducing the production efficiency.

The purpose of this invention is to correct these disadvantages.

DESCRIPTION OF THE INVENTION

Consequently, the invention suggests a process in which thinning is done collectively and no longer individually. Therefore, the cost is lower and the efficiency is better.

More precisely, the purpose of the invention is a process for the collective production of integrated magnetic heads that consists of making several components on a board, each with specific means capable of forming at least one magnetic head, these means comprising in particular polar parts separated by an airgap, and separating the components at the end of the process to obtain heads with an appropriate shaped supporting surface, this process being characterized in that the components are collectively thinned by etching the board in a direction perpendicular to the plane of the board along areas overlapping the polar parts, the individual heads thus obtained having a supporting surface with a low determined height in the said direction.

The thinning operation may be done by photolithography or by mechanical etching or by a combination of these two techniques.

DETAILED DESCRIPTION OF EMBODIMENTS

Figure 1:
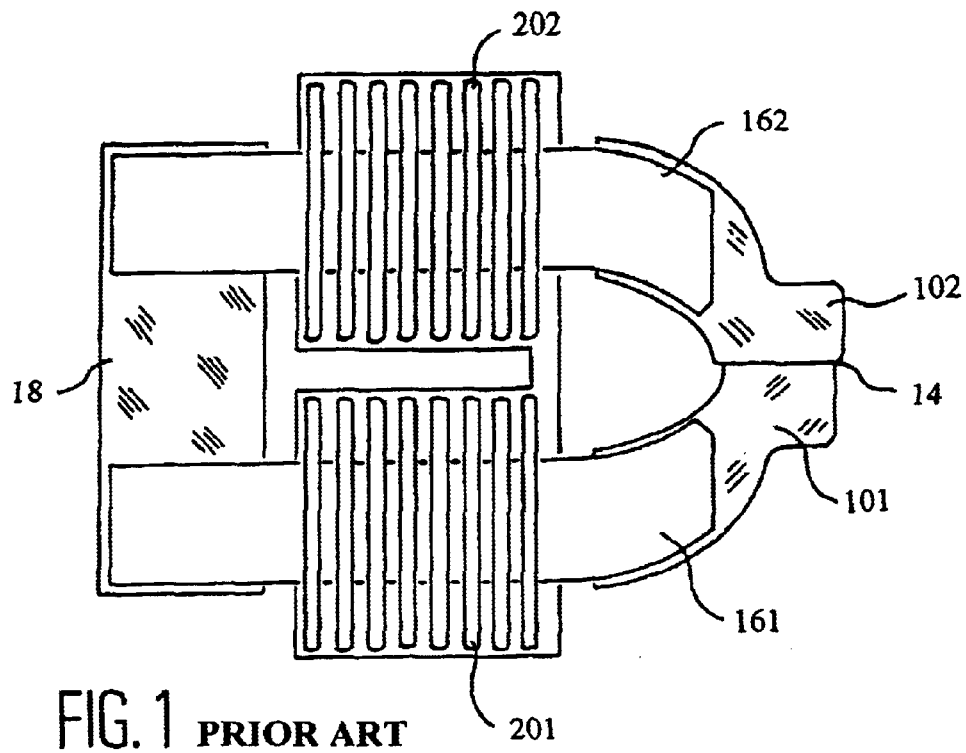
FIG. 1, already described, shows a magnetic head according to the current practice.
Figure 2:
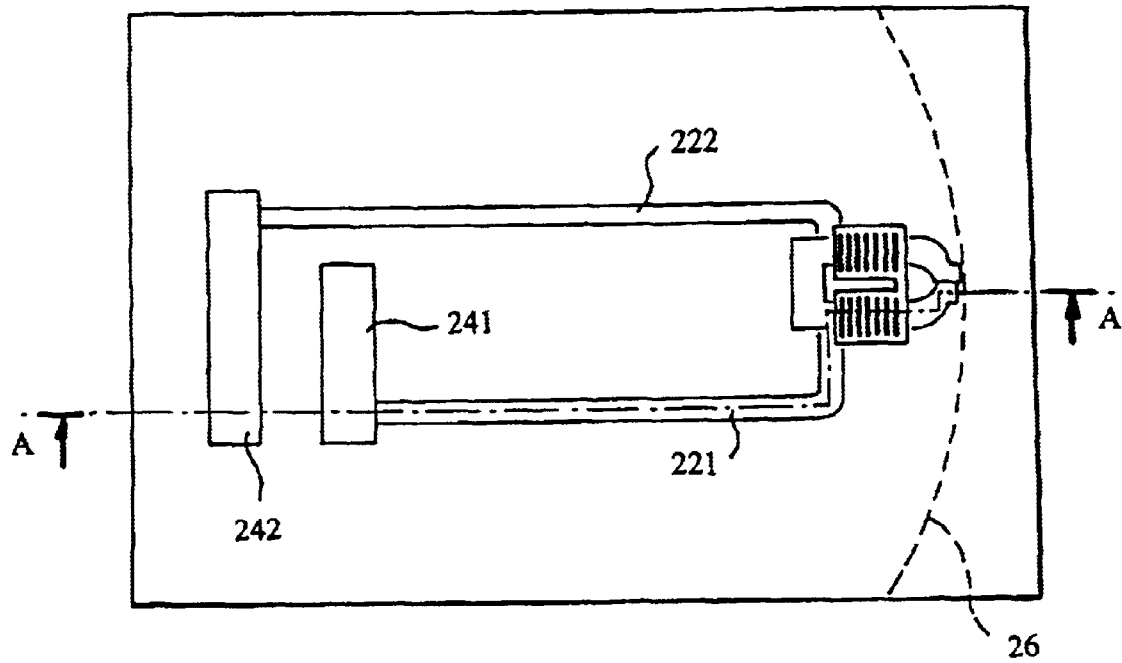
FIG. 2, already described, shows a top view of a magnetic head with its electrical connection pins.
Figure 3:
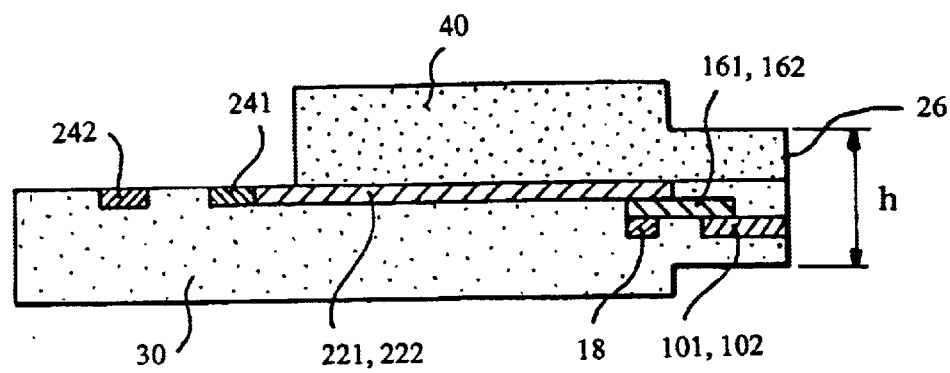
FIG. 3, already described, shows a sectional view through the same head.
Figure 4:
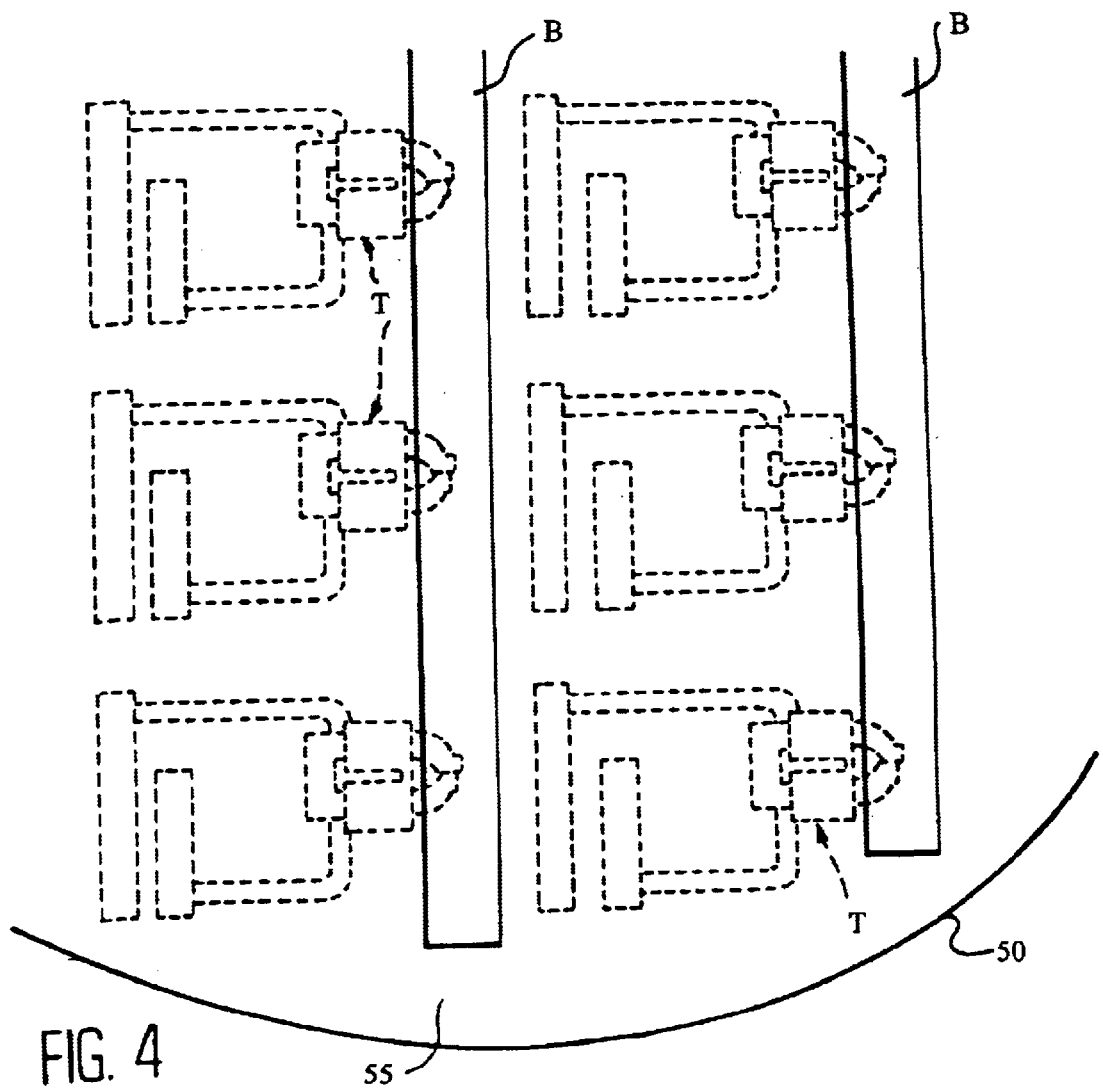
FIG. 4 shows a top view of a board with collective etching areas to be thinned.

FIG. 4 shows a board 50 comprising components T. This board is obtained by any known collective process and particularly by the process described in document FR-A-2 747 226 mentioned above. These components contain each of the elements already shown in FIG. 2. According to the invention, this board is etched in a direction perpendicular to its plane, and polar parts of the various components overlap along the areas B. In this etching, the edge of the board is masked to leave an outer ring 55 to maintain a certain stiffness of the board.

Figure 5:
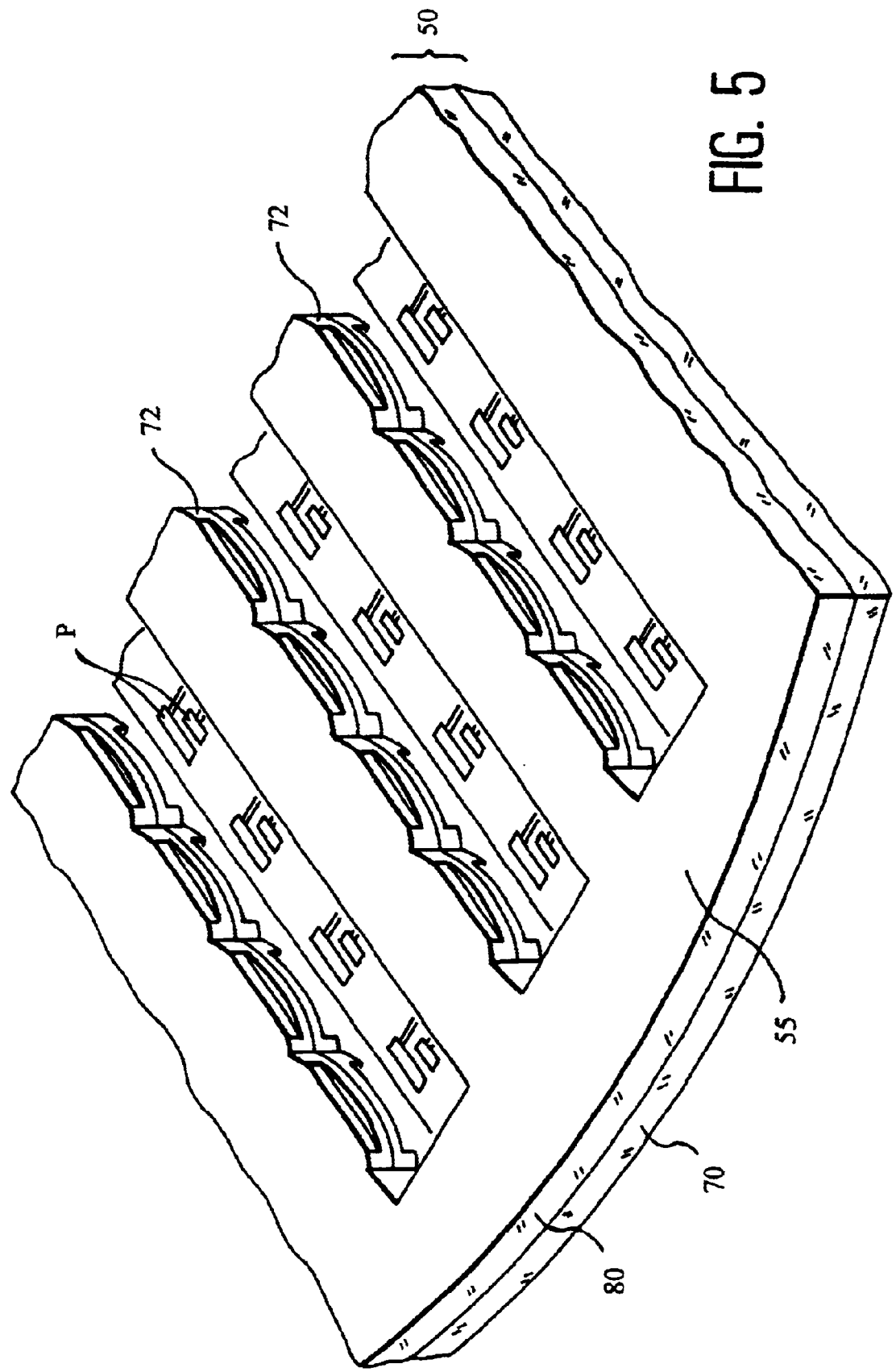
FIG. 5 shows a perspective view of a board after partial etching.

FIG. 5 shows a perspective view of the board 50 with etching close to polar parts in a manufacturing method in which the shape of the supporting area 72 of the heads was also obtained collectively. This FIG. 5 also shows that the board may comprise a substrate 70, supporting the components and a superstrate 80 covering them.

Figure 6:
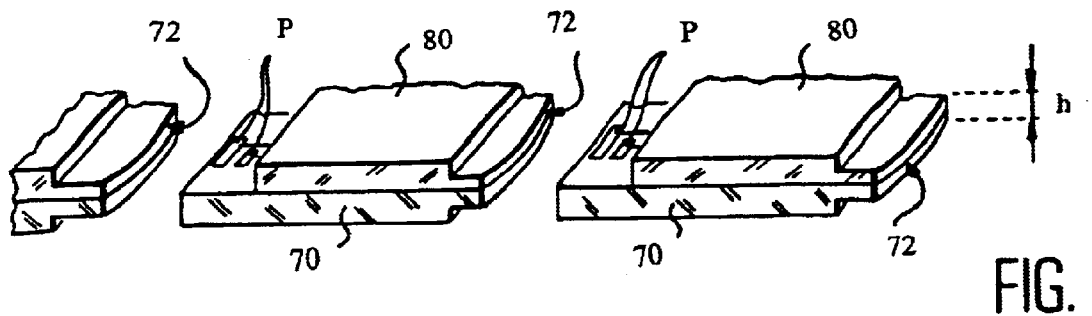
FIG. 6 shows a more detailed view of the shape of heads with a thinned supporting surface.

FIG. 6 shows the shape and thickness of the supporting surface and the connection pins P in more detail.

Figure 7:
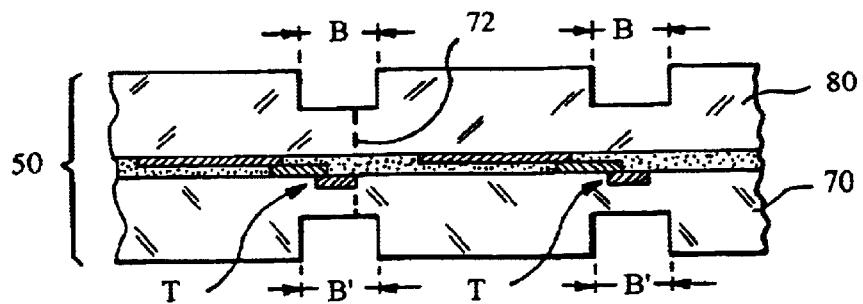
FIG. 7 illustrates a manufacturing method with double photolithography.
Figure 8:
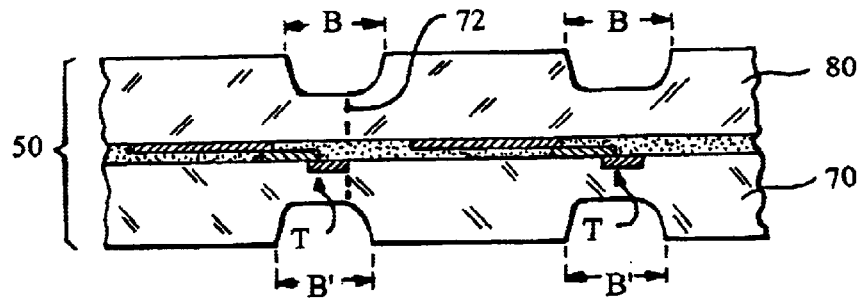
FIG. 8 illustrates a manufacturing method with double mechanical etching.
Figure 9:
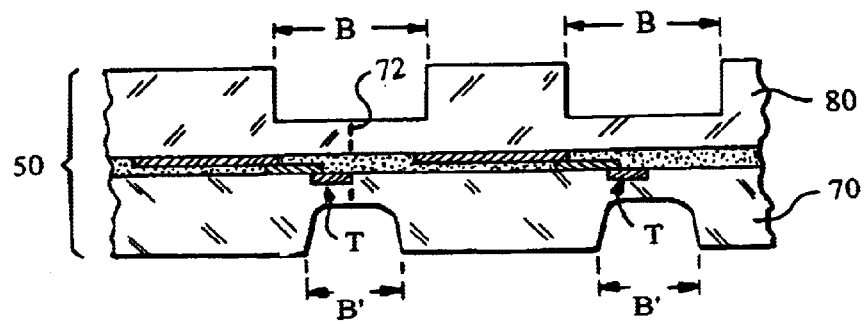
FIG. 9 illustrates a mixed manufacturing method, including photolithography and mechanical etching.

As mentioned above, any type of etching may be used in order to collectively thin the supporting surface. FIGS. 7 to 9 non-exhaustively show three particular etching methods; FIG. 7 shows photolithography of areas B in the superstrate and areas B' in the substrate; FIG. 8 shows mechanical etching; FIG. 9 shows photolithography B of the superstrate and mechanical etching B' of the substrate.

Mechanical photolithography may be done using a mask, the edges of which define the width of the opening to be formed. The straightness and width of the openings in the mask are not critical as they would be if the objective were to define the supporting surface, since the only objective is to make the board thinner.

Mechanical etching may consist of grooving formed using strips or grinding wheels, for example diamond cutting wheels with controlled depth. A single blade or a module containing several blades may be used (for example periodically spaced) in order to machine several modules at the same time, thus increasing productivity. A programmable control is used to start and finish grooving by lowering and raising the blades respectively (along the direction perpendicular to the surface of the board) without starting or stopping at the edge of the board, so that an ungrooved area is left around the periphery of the board to improve the overall stiffness.

The process that was described above may be used in combination with another process described and claimed in a French patent application entitled "Process for the collective production of integrated magnetic heads with a supporting surface obtained by photolithography" deposited by the applicant of this patent on the same day as the application for this patent.

Photolithography operations designed to create the shape of the supporting surface may be applied before or after thinning operations, or at the same time.

FIGS. 10A, 10B, 10C and 10D illustrate a process in which these two techniques are combined.

Figure 10A:
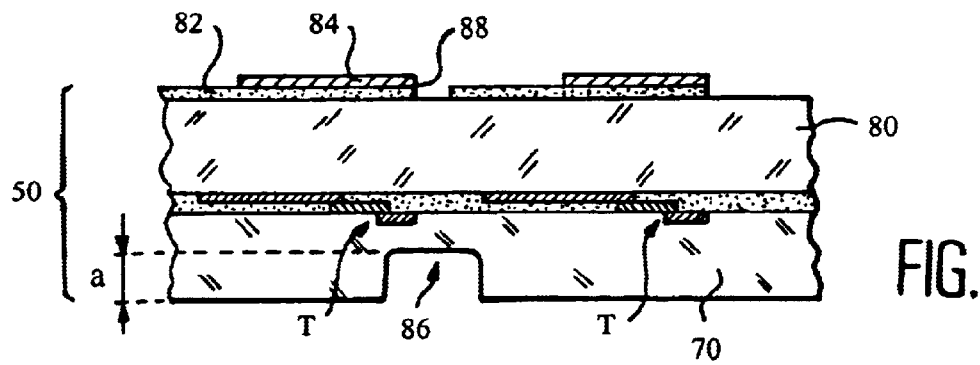
FIGS. 10A, 10B, 10C, 10D show four steps in a particular embodiment of the invention.

The first thing that can be seen in FIG. 10A is a board 50 (typically 300 $\mu$m thick) with a substrate 70, a superstrate 80 and components T. The first step is to etch the substrate to excavate first grooves 86 at least partly overlapping polar parts. The depth "a" of the groove may be about 105 $\mu$m and its width may be 200 $\mu$m This etching may be achieved by mechanical machining (for example using a saw) or by deep etching (for example using plasma).

The next step is to deposit a double mask 82, 84 on the superstrate. For example, the mask 82 may be made of 0.5 $\mu$m of $SiO_2$, and the mask 84 may be made of resin.

Figure 10B:
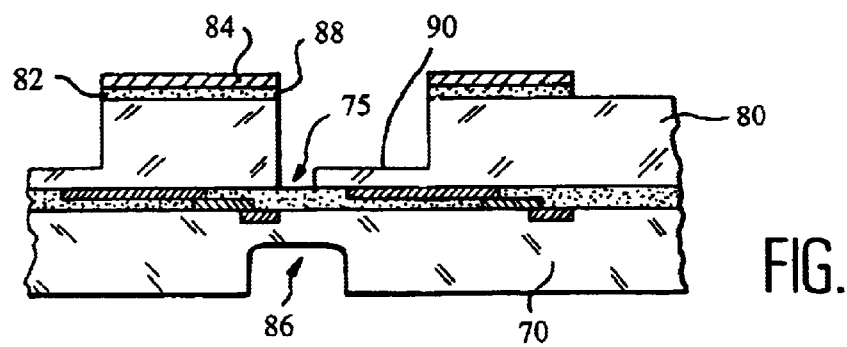
Figure 10C:
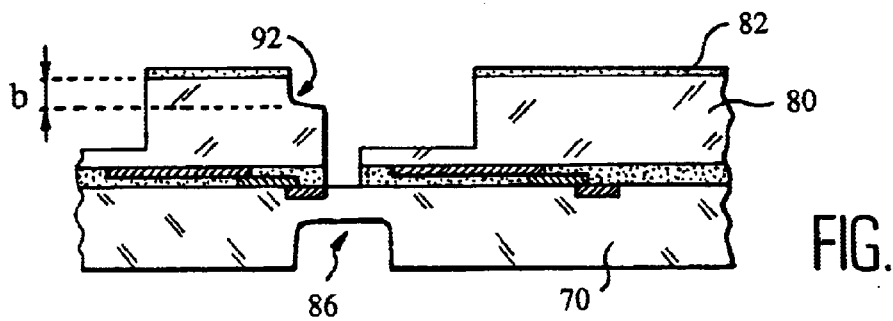
Figure 10D:
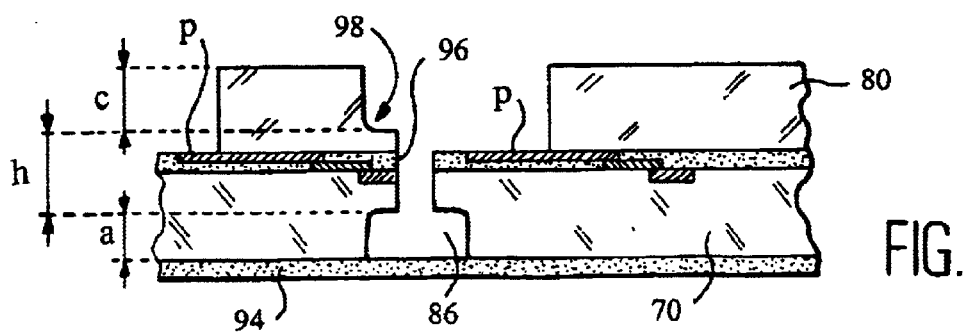

These masks are etched to form a common rounded edge above the polar parts to define the shape of the supporting surface, and a straight edge above the connections. The next step is etching through this double mask, which consumes mask 82 completely (FIG. 10B). There is still part of the unetched superstrate on the area above the electrical connections, but the area located in front of the polar parts is fully etched along a surface 88 as far as the stop layer 75 which is the upper layer of the substrate (for example made of $SiO_2$). This stop layer is then etched in an appropriate reactor (for example RGV plasma).

After taking off the resin mask 84, a second groove 92 is formed in the superstrate (FIG. 10C) to start to thin the supporting surface. The depth "b" of this groove may be 55 $\mu$m and its width may be 100 $\mu$m from the edge 88. The objective is to thin the surface with a precision of the order of one micron.

Finally, (FIG. 10D), the board is mounted on a flexible adhesive film 94 and the substrate is etched until it is perforated and enters groove 86. This etching gives an appropriate shaped supporting surface 96 to the polar parts. The connection pins P are then cleared, for example by RIE etching. The depth of groove 92 is increased to give a groove 98 with a depth equal to "c". The result is a supporting surface with height "h", with two etchings 86 and 98 with depths "a" and "c". For example, the depths "a" and "c" may be of the order of 105 $\mu$m and the height "h" may be of the order of 90 $\mu$m. It is easy to adapt depths "a" and "c", to obtain the required height "h" and to center polar parts within the thickness of the supporting surface.

All that remains to be done is to separate the heads and to mount them on bases.

What is claimed is:

1. A method process for collective production of integrated magnetic heads, the process comprising:

making a plurality of components on a board, each component formed into a magnetic head having a supporting surface and comprising first and second polar parts separated by an air gap;

etching the board in a direction perpendicular to a plane of the board so as to collectively thin the supporting surface of each of the plurality of components at a location adjacent the first and second polar parts to round the supporting surface for each of the plurality of components; and separating the plurality of components to obtain individual magnetic heads, wherein the board comprises a substrate supporting the components and a superstrate covering said components, and in which the substrate and the superstrate are thinned by etching them to obtain supporting surfaces with a height.

2. The process according to claim 1, in which the board is thinned by photolithography.

3. The process according to claim 1, in which the board is thinned by mechanical etching.

4. The process according to claim 1, in which the board is thinned partly by photolithography and partly by mechanical etching.

5. The process according to claim 1, in which thinning does not affect a periphery of the board such that an outer ring disposed at the periphery of the board has original thickness.

6. The process according to claim 1, in which a first groove is formed to at least partially overlap said first and second polar parts.

7. The process according to claim 6, wherein the superstrate is etched through a double mask to define the shape of the supporting surface close to the polar parts, a second groove is formed to thin the superstrate close to the polar parts, and the superstrate is etched in front of the polar parts to open up into the first groove.

8. The process according to claim 1, wherein the height of the supporting surfaces is about 90 microns in said direction.

9. A method for collective production of integrated magnetic heads, the method comprising:

making a plurality of components on a board, each component formed into a magnetic head having a supporting surface and comprising first and second polar parts separated by an air gap;

etching the board in a direction perpendicular to a plane of the board so as to collectively thin a supporting surface of each of the plurality of components at a location adjacent the first and second polar parts to round the supporting surface, and wherein the height of the supporting surface is less than the thickness of the board; and separating the plurality of components to obtain individual magnetic heads.

10. The method according to claim 9, wherein the board is thinned by photolithography.

11. The method according to claim 9, wherein the board is thinned by mechanical etching.

12. The method according to claim 9, wherein the board is thinned by photolithography and by mechanical etching.

13. The method according to claim 9, wherein thinning does not affect a periphery of the board such that an outer ring disposed at the periphery of the board has original thickness.

14. The method according to claim 9, wherein a first groove is formed to at least partially overlap the first and second-polar parts.

15. The method according to claim 14, wherein the superstrate is etched through a double mask to define the shape of the supporting surface close to the polar parts, a second groove is formed to thin the superstrate close to the polar parts, and the superstrate is etched in front of the polar parts to open up into the first groove.

16. The method according to claim 9, wherein the height of the supporting surfaces is about 90 microns in the direction.

* * * * *